US008662481B2

(12) United States Patent
Laslo

(10) Patent No.: US 8,662,481 B2
(45) Date of Patent: Mar. 4, 2014

(54) SYSTEM AND METHOD FOR PREVENTING SCALING IN A FLUE GAS DESULPHURIZATION SYSTEM

(71) Applicant: ALSTOM Technology Ltd, Baden (CH)

(72) Inventor: Dennis James Laslo, Ten Mile, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/973,551

(22) Filed: Aug. 22, 2013

(65) Prior Publication Data
US 2013/0336869 A1 Dec. 19, 2013

Related U.S. Application Data

(62) Division of application No. 12/046,613, filed on Mar. 12, 2008, now Pat. No. 8,540,219.

(60) Provisional application No. 60/895,268, filed on Mar. 16, 2007.

(51) Int. Cl.
*B01F 3/04* (2006.01)
*B08B 5/00* (2006.01)
*B08B 17/00* (2006.01)

(52) U.S. Cl.
CPC ......... *B01F 3/04099* (2013.01); *B01F 3/04106* (2013.01); *B08B 5/00* (2013.01); *B08B 17/00* (2013.01)

USPC .......................................... 261/121.1; 261/126

(58) Field of Classification Search
CPC .... B01F 3/04; B01F 3/04099; B01F 3/04106; B08B 5/00; B08B 17/00
USPC ........................ 261/121.1, 126; 134/22.1, 198
See application file for complete search history.

(56) References Cited

U.S. PATENT DOCUMENTS

| | | | | |
|---|---|---|---|---|
| 1,832,469 | A * | 11/1931 | Neill et al. | ...................... 261/87 |
| 5,928,615 | A | 7/1999 | Strock et al. | |
| 6,086,658 | A | 7/2000 | Gohara et al. | |

FOREIGN PATENT DOCUMENTS

| | | |
|---|---|---|
| EP | 0 246 180 | 11/1987 |
| EP | 0 711 590 | 5/1996 |
| EP | 1 243 308 | 9/2002 |
| JP | 61120623 | 6/1986 |
| JP | 05285331 | 11/1993 |
| JP | 07031841 | 2/1995 |
| JP | 08000950 | 1/1996 |
| JP | 2002316015 | 10/2002 |

* cited by examiner

*Primary Examiner* — Robert A Hopkins
(74) *Attorney, Agent, or Firm* — Rita D. Vacca

(57) ABSTRACT

A system & Method for Preventing Scaling in a Flue Gas Desulphurization System is provided. The system includes an injector configured to direct a barrier fluid toward a surface that is otherwise susceptible to scaling when it comes in contact with super-saturated alkaline solutions such as slurry used to capture CO2 from a flue gas stream.

10 Claims, 14 Drawing Sheets

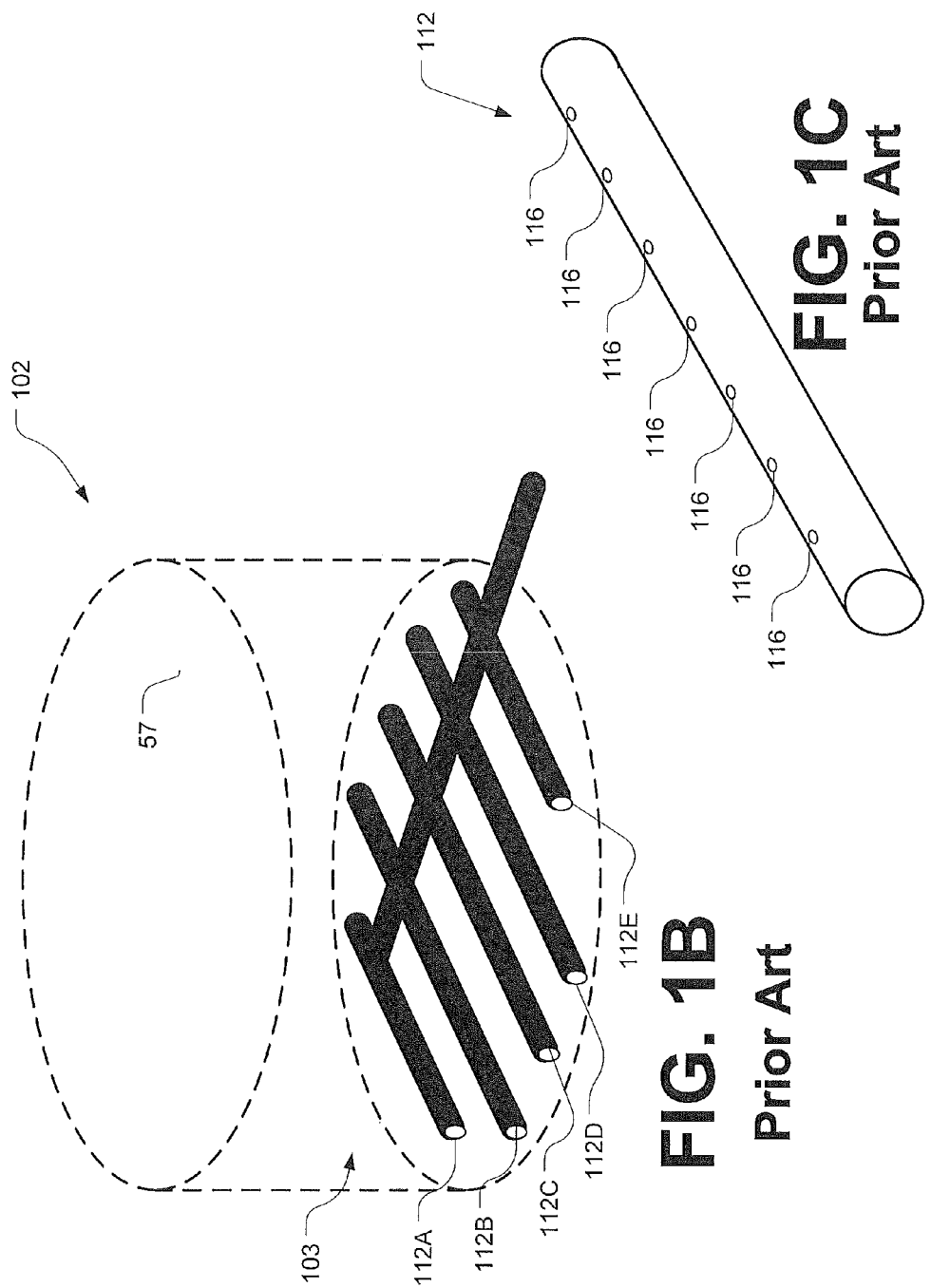

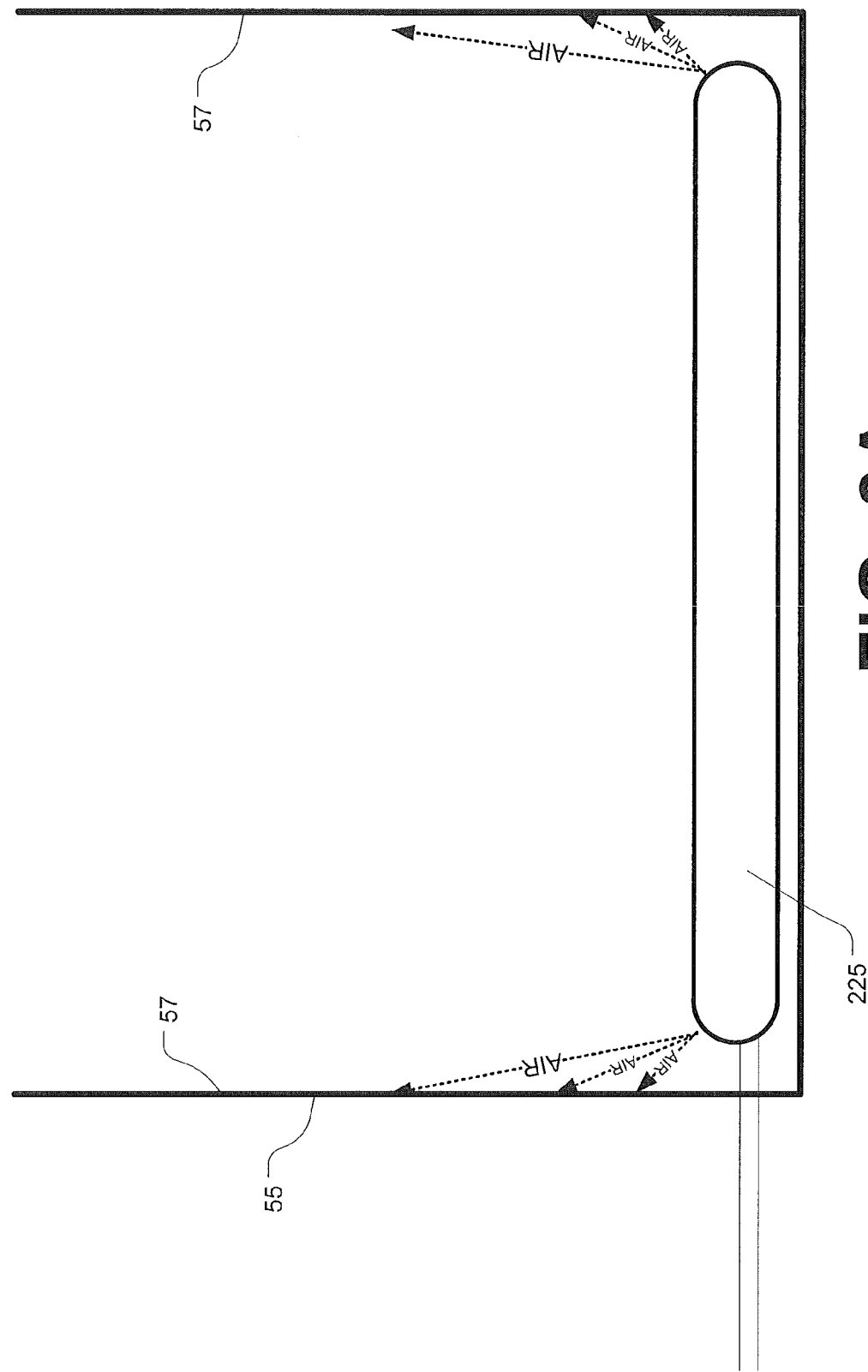

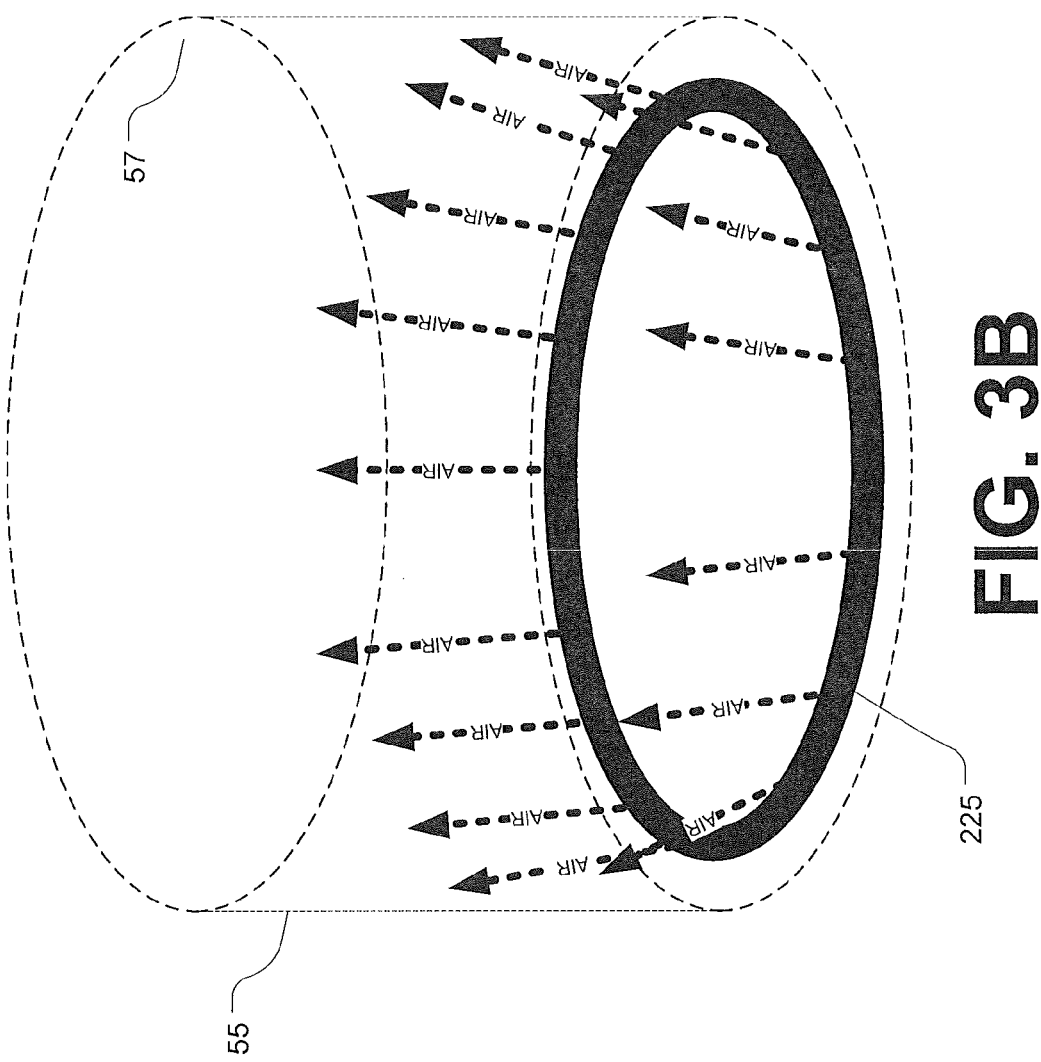

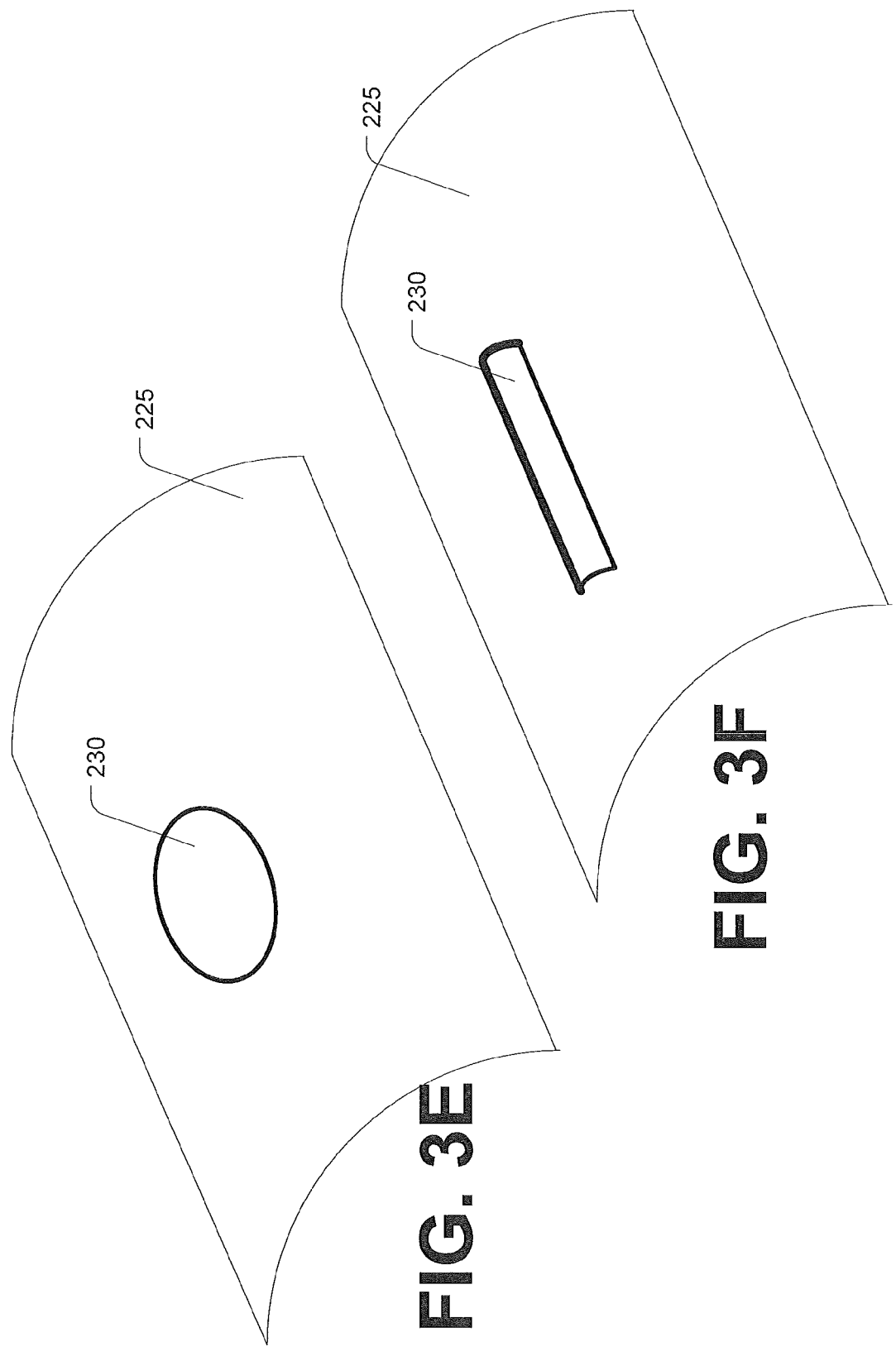

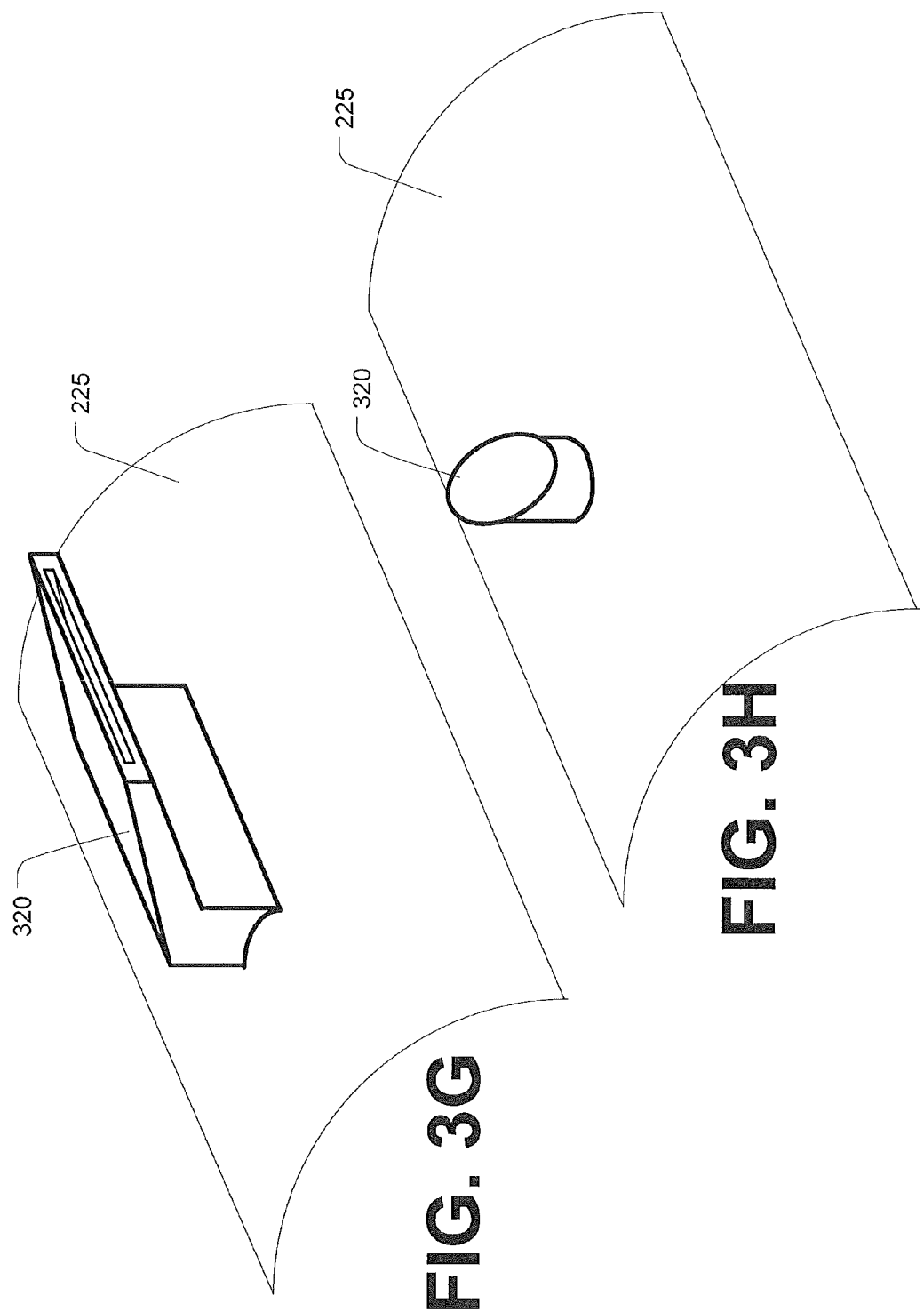

SYSTEM AND METHOD FOR PREVENTING SCALING IN A FLUE GAS DESULPHURIZATION SYSTEM

CROSS-REFERENCE TO RELATED APPLICATION

This application claims priority to U.S. application Ser. No. 12/046,613 filed Mar. 12, 2008 now U.S. Pat. No. 8,540,219, entitled SYSTEM & METHOD FOR PREVENTING SCALING IN A FLUE GAS DESULPHURIZATION SYSTEM, claiming priority to U.S. provisional application entitled WALL SPARGER having U.S. Ser. No. 60/895,268, filed Mar. 16, 2007, each of which is entirely incorporated herein by reference.

FIELD OF THE INVENTION

The proposed invention is directed to preventing scaling in a flue gas desulphurization system. More particularly, the proposed invention is directed to preventing scaling and build up in an absorber tower of a wet flue gas desulphurization system.

BACKGROUND

Fossil fuel fired boiler systems, such as those found and used in conjunction with, for example, electric power generation systems typically expel exhaust by-products resulting from the combustion of fossil fuel. This exhaust (or flue gas) often contains various chemical compounds, such as, for example, sulfur dioxide ($SO_2$) that are not desirable for releasing into the atmosphere for general air flow dispersal. As a result, systems are provided to remove certain chemical compounds from the flue gas stream from a fossil fuel fired boiler before the flue gas is released into the atmosphere. Such systems include, for example, wet flue gas desulphurization systems (WFGD) that are configured to remove at least a portion of sulphur dioxide ($SO_2$) that may be contained in the flue gas stream, before it is released into the atmosphere.

In wet flue gas desulphurization (WFGD) systems such as the one depicted in the diagram of FIG. 1, an absorber tower 50 is provided and configured to subject a flue gas stream (FG) to an alkaline slurry 130 that captures at least a portion of $SO_2$ that may be present in the flue gas stream. The absorber tower 50 has an upper section 52 and a tank section 55. The upper section 52 houses a plurality of spray heads 120 configured to spray the slurry into the flue gas stream (FG) as it elevates through the upper section 52 to exit the absorber tower 50. Slurry is pumped to the spray heads from near the bottom of the tank section 55 via one or more pumps 141, 142 and/or 143. As the flue gas FG comes in contact with the slurry, $SO_2$ in the flue gas is captured by the alkaline slurry.

With reference to FIG. 1B and FIG. 1C, tank section 55 may be configured to include a series of air outlets 112 for introducing air into the slurry contained in the tank section 55. This air is provided to help speed up the neutralization of $SO_2$ contained in the slurry. Each of the air outlets 112 is configured to include one or more orifices for releasing air into slurry contained within the tank section 55. The upward migration of these air bubbles occurs within the center portion of the tank section 55, away from the wall(s) 57. As a result the force of the upward migrating air bubbles tends to push fresh slurry near the top of the tank section 57 outward away from the center area of the tank section 55 and toward the wall(s) 57. The migration of air bubbles and the flow of fresh slurry is generally depicted in the diagram shown in FIG. 1D.

FIG. 1B is a diagram generally depicting the tank section 55 of the absorber tower 50. In this example, the interior wall(s) of the tank section 55 is not congested with accumulated scaling.

The example depicted in FIG. 1B and FIG. 1C shows a tank section 55 that is configured to include a pipe grid 112 for introducing a gas, such as air, into the slurry contained in the tank section 55. Each of the air outlets 112A-112E is configured to include one or more orifices 116 for releasing air into slurry contained within the tank section 55. These air outlets 112 are provided to help evenly distribute the air throughout the slurry as fine bubbles which travel to the liquid surface through buoyant forces.

With reference to FIG. 1A and FIG. 1D the general function of the WFGD will be discussed. After slurry is sprayed into the upper section 52 of the absorber 50 via the spray heads 120, the slurry comes into contact with flue gas flowing through the absorber tower 50. This slurry makes contact with the flue gas and captures at least a portion of the $SO_2$ that may be contained in the flue gas. This slurry with newly absorbed $SO_2$ (fresh slurry) falls downward toward and into the tank section 55. When the fresh slurry enters the tank section 52, the newly absorbed $SO_2$ that is in the alkaline slurry is not yet completely neutralized. Until the $SO_2$ reacts with oxygen and calcium carbonate and forms a stable gypsum crystal, the solution may become supersaturated with respect to either calcium sulfite or calcium sulfate. In this supersaturated state, the solution is prone to cause scaling to occur on interior surfaces of the tank section 55.

With reference to FIG. 1A, FIG. 1D & FIG. 1E, the fresh slurry resides in the tank section 55 until it is pumped out or re-circulated by circulation pump 141, 142 & 143 back to the spray heads 120 in the upper section 52. While in the tank section 55, the fresh slurry eventually, over time, migrates downward toward the bottom of the tank section 55. By the time fresh slurry reaches near the bottom of the tank section 55, the solution approaches equilibrium and thus the slurry is no longer as saturated as when it first entered the top of the tank section (as fresh slurry). Thus, this "aged slurry" tends to be less likely to react with the interior wall of the tank section 55 and, as a result, does general result in the build up of much, if any, scaling on the interior wall.

FIG. 1E is a diagram depicting the tank section 55 after scaling 65 has accumulated on the interior wall 57. FIG. 1E is a diagram depicting a partial cut-away view of the tank section 55 after scaling 65 has accumulated on the interior wall 57.

With reference to FIG. 1E and FIG. 1F, in the absorber tower 50, it is common for scaling to occur and accumulate along the interior wall(s) 57 of the absorber tower 50 due to the supersaturated nature of the slurry freshly subjected to the flue gas stream (fresh slurry). This scaling typically occurs in and around the tank section 55 of the absorber tower 50; however it is not limited to this area alone.

From time-to-time, accumulated scaling must be removed from the absorber tank wall(s). In order to remove the scaling, it is typically necessary to shut down the WFGD system 25 and manually enter the absorber tank 50 to physically remove the scaling from the walls(s). This often requires the set up and subsequent removal of equipment, such as, for example, scaffolding and safety equipment within the interior of the absorber tank to allow personnel to reach areas on the absorber tank interior wall where scaling has occurred and safely remove it.

Shutting down the WFGD, as well as setting up systems for personnel to use in removing the scaling from the interior walls is a time consuming and expensive endeavor. Further, introducing personnel into the enclosed space of the absorber tank subjects them to potential safety risks associated with scaling falling from the interior walls.

SUMMARY OF THE INVENTION

Embodiments of the present invention provide a system and method for reducing scaling in a flue gas desulphurization system. Briefly described, in architecture, one embodiment of the system, among others, can be implemented as follows. There is provided an injector configured to be placed into a tank section of an absorber tower. The injector is further configured to direct a fluid into slurry within the tank section so as to push aged slurry toward an interior wall of the tank section.

Embodiments of the present invention can also be viewed as providing methods for scaling in a flue gas desulphurization system. In this regard, one embodiment of such a method, among others, can be broadly summarized by the following step of: placing a non-super saturated slurry against an interior surface of an absorber tower.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention may be better understood and its numerous objects and advantages will become apparent to those skilled in the art by reference to the accompanying drawings in which:

FIG. 1B and FIG. 1C are diagrams generally depicting a typical gas outlets 112.

FIG. 3A-FIG. 3C are diagrams generally depicting a possible implementation of injector 225.

FIG. 3E-FIG. 3F are diagrams generally depicting examples of possible configurations of orifices 230 on the injector 225.

FIG. 3G-FIG. 3H are diagrams generally depicting examples of possible configurations of nozzles 320 that may be used in conjunction with the injector 225.

DESCRIPTION OF INVENTION

The proposed invention is directed to a system and method for keeping slurry rich with $SO_2$ (fresh slurry) away from the walls of the spray tower 50 by placing a barrier between the fresh slurry and the wall(s) of the tank section 55 of the spray tower 50. By keeping the fresh slurry, which is still highly supersaturated, away from the absorber tower walls, scaling and build-up along the interior surfaces of the absorber tower 50 is greatly reduced, if not eliminated.

In one embodiment of the proposed invention, the barrier is created by forcing aged slurry resident near the bottom of the tank section 55, and that is no longer highly reactive, from the bottom of the tank section 55 upward and against the inside perimeter of the wall(s) of the tank section 55. The aged slurry may be forced from near the bottom of the tank section 55 by various means.

Figure 1A:
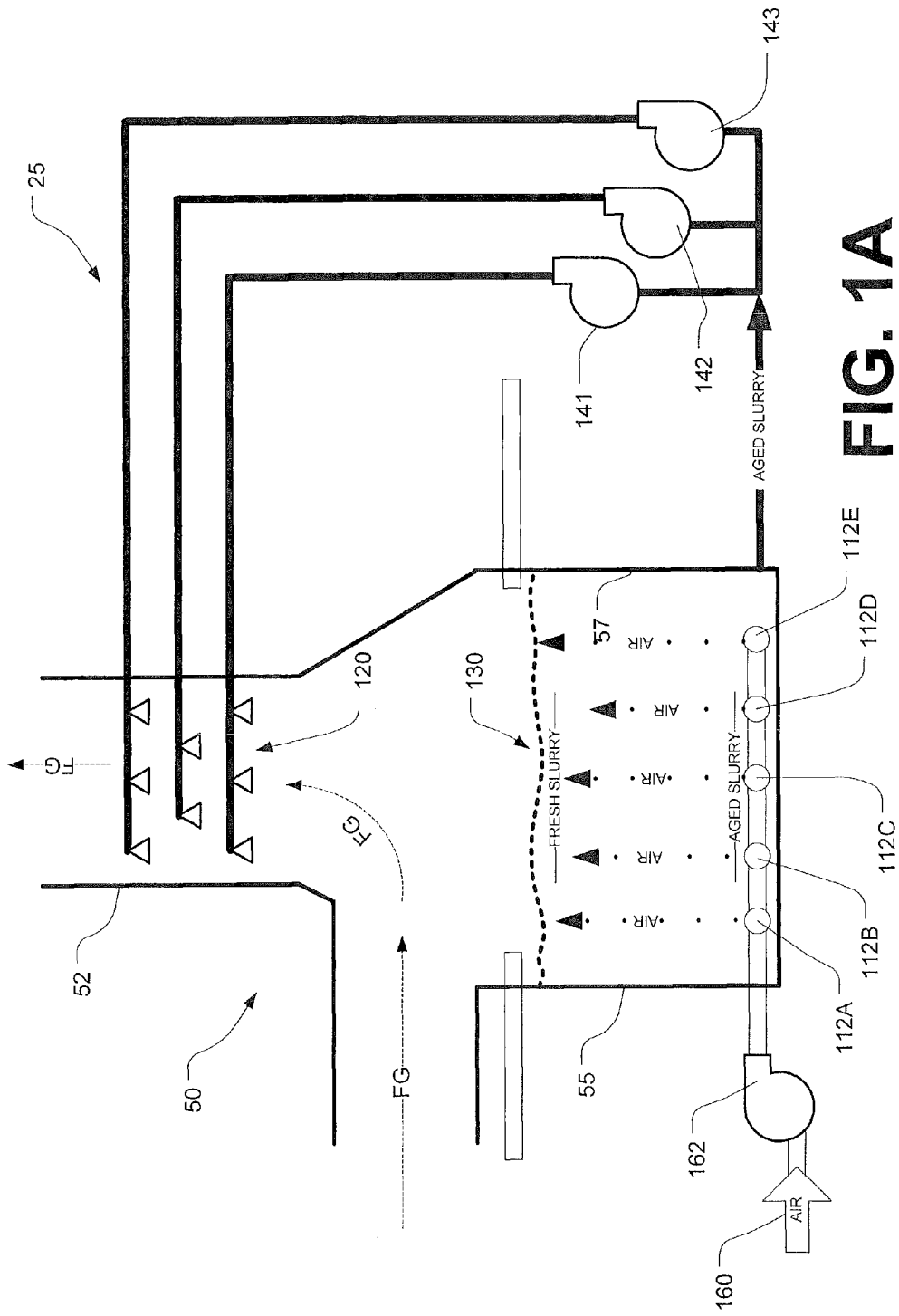
FIG. 1A is a diagram generally depicting a typical flue gas desulphurization system 25.
Figure 1D:
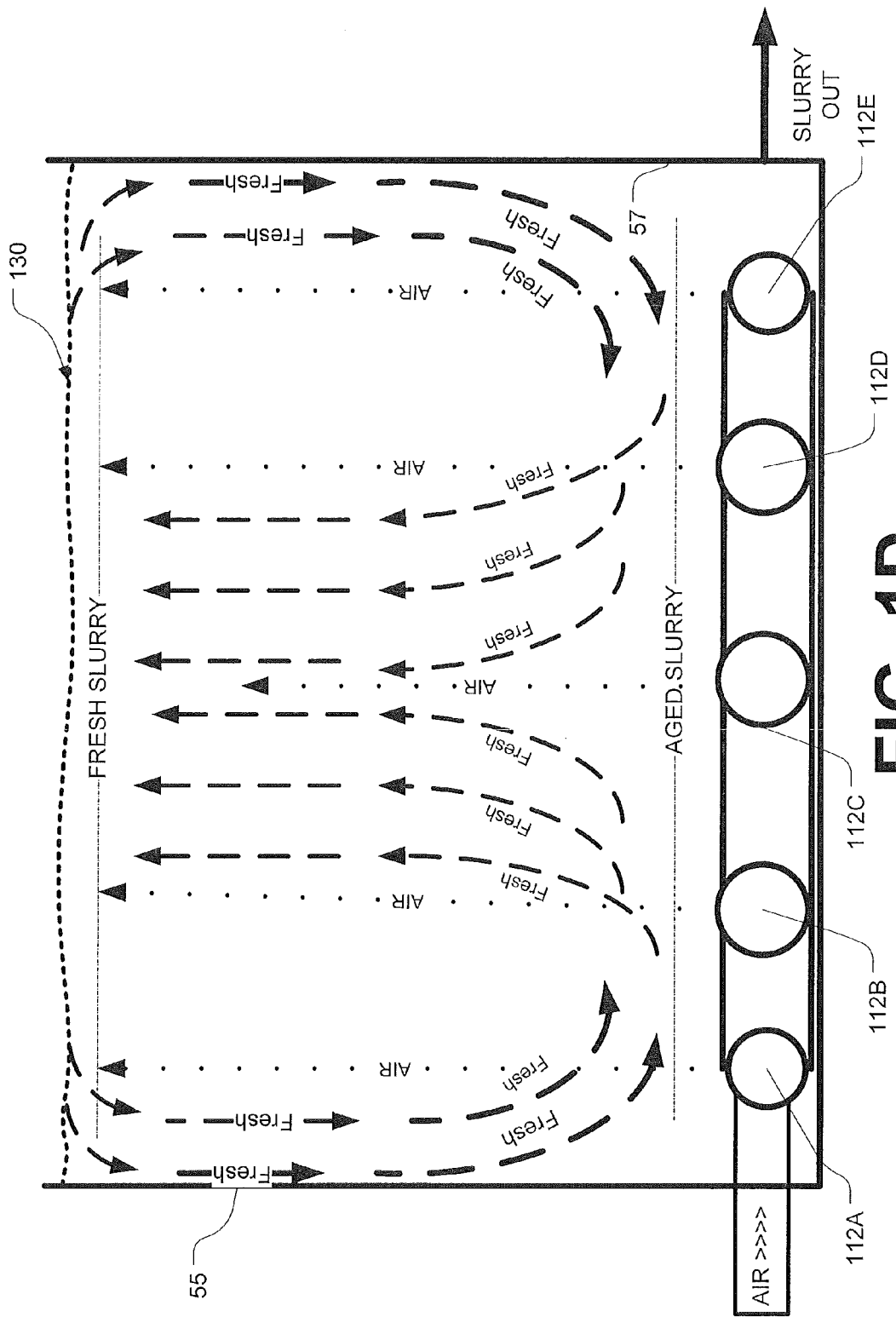
FIG. 1D is a diagram generally depicting the migration and flow of slurry 130 from top to bottom in the tank section 55.
Figure 1E:
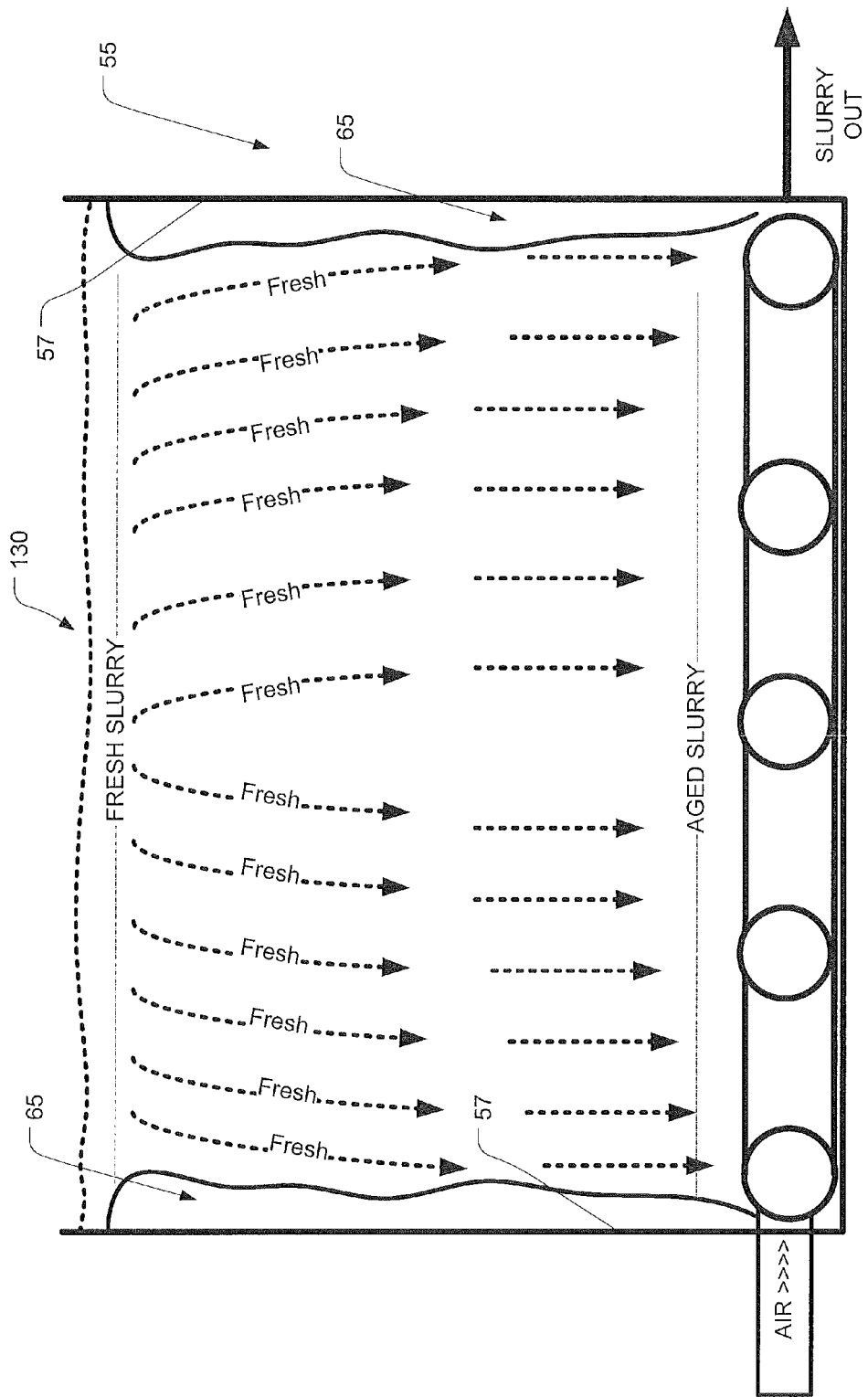
FIG. 1E and FIG. 1F are diagrams generally depicting scaling that occurs along the interior wall 57 of the tank section 55 of the absorber tower 50.
Figure 1F:
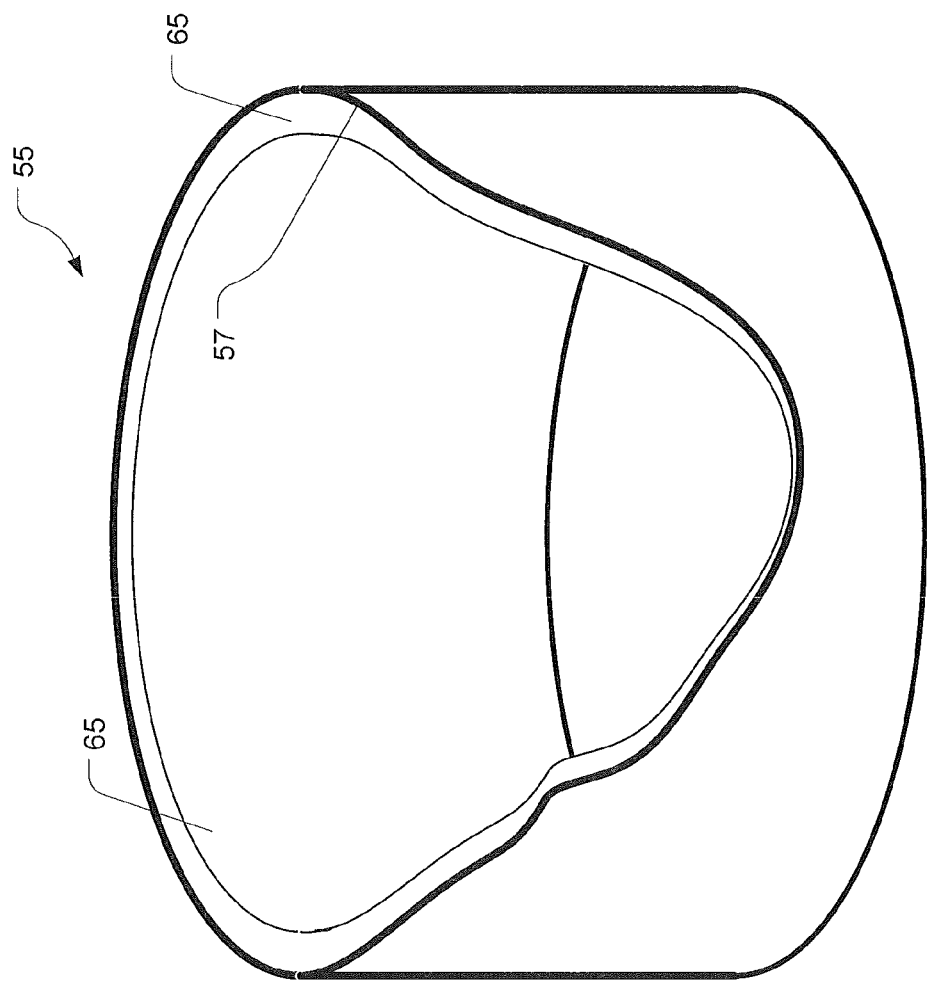
Figure 2:
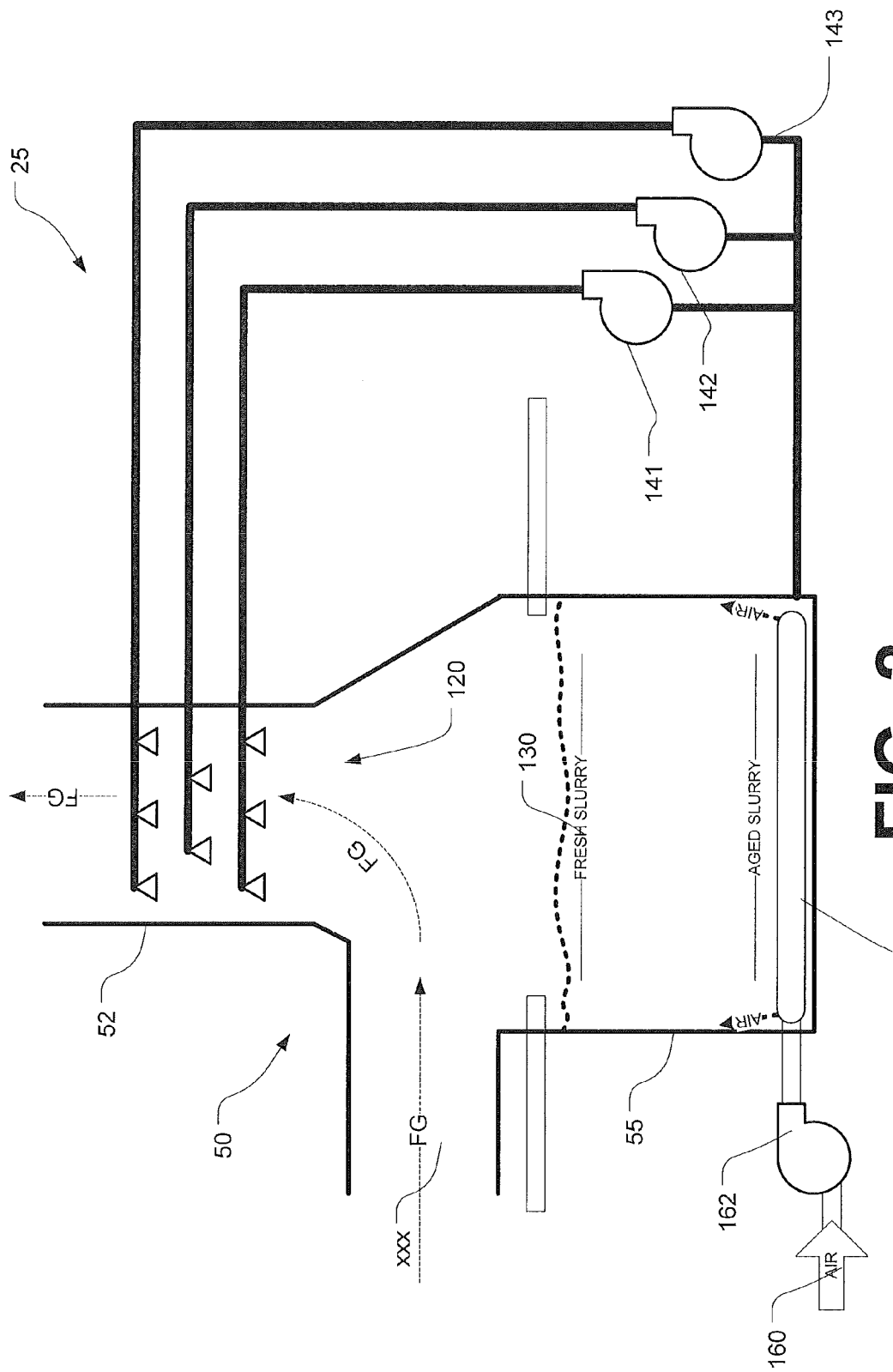
FIG. 2 is a diagram generally depicting an embodiment of the proposed invention in which a gas injector 225 is provided.

FIG. 2 is a diagram generally depicting an embodiment of the proposed invention. In this embodiment, the absorber tower 50 is provided with one or more injectors 225 configured to spray a fluid, such as air, in a directed manner that causes aged slurry located near the bottom of the tank section 55 to be pushed or lifted upward and against the wall 57 of the tank section 55.

Figure 3C:
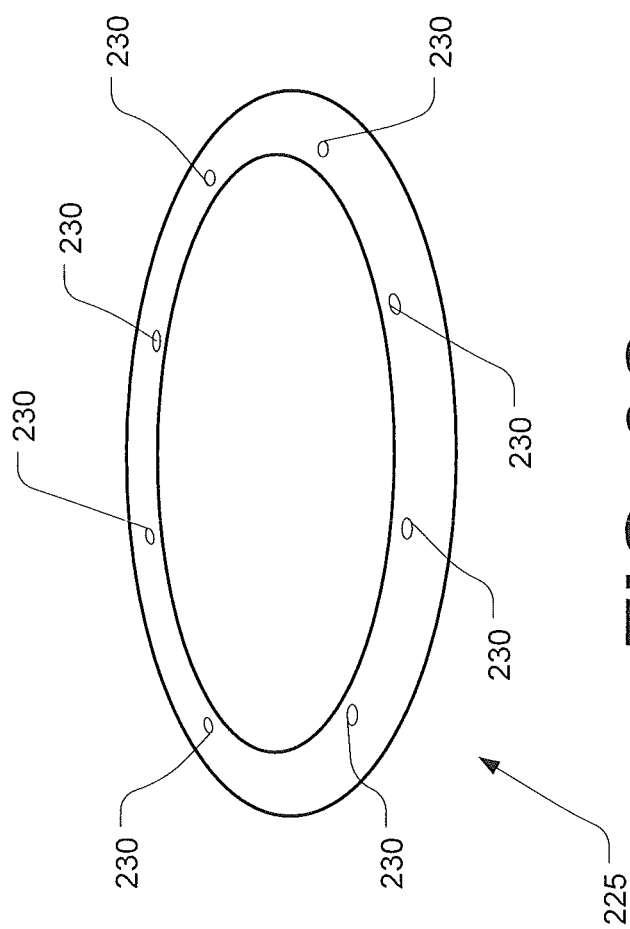

FIG. 3A-FIG. 3C are diagrams generally depicting a possible implementation of the injector 225. In this example, the injector system 225 is configured to spray a fluid, such as air, upward toward the interior wall 57 of the tank section 55. The injector 225 is preferably a hollow tube-like conduit having an interior cross section of a given length. The injector 225 is generally ring shaped and has a diameter that is less than the diameter or cross-section of the tank section 55, although it is completely possible to configure injector 225 in other shapes to best provide coverage of the interior tank section 55 wall 57. The injector 225 is further configured to provide one or more apertures 230 for allowing a fluid pumped into the injector 225 to be released in a given direction and in a given pattern of dispersion. The number of apertures disposed along the injector 225 are contingent upon, among other things, the extent of desired coverage of the interior wall 57 surface.

Figure 3D:
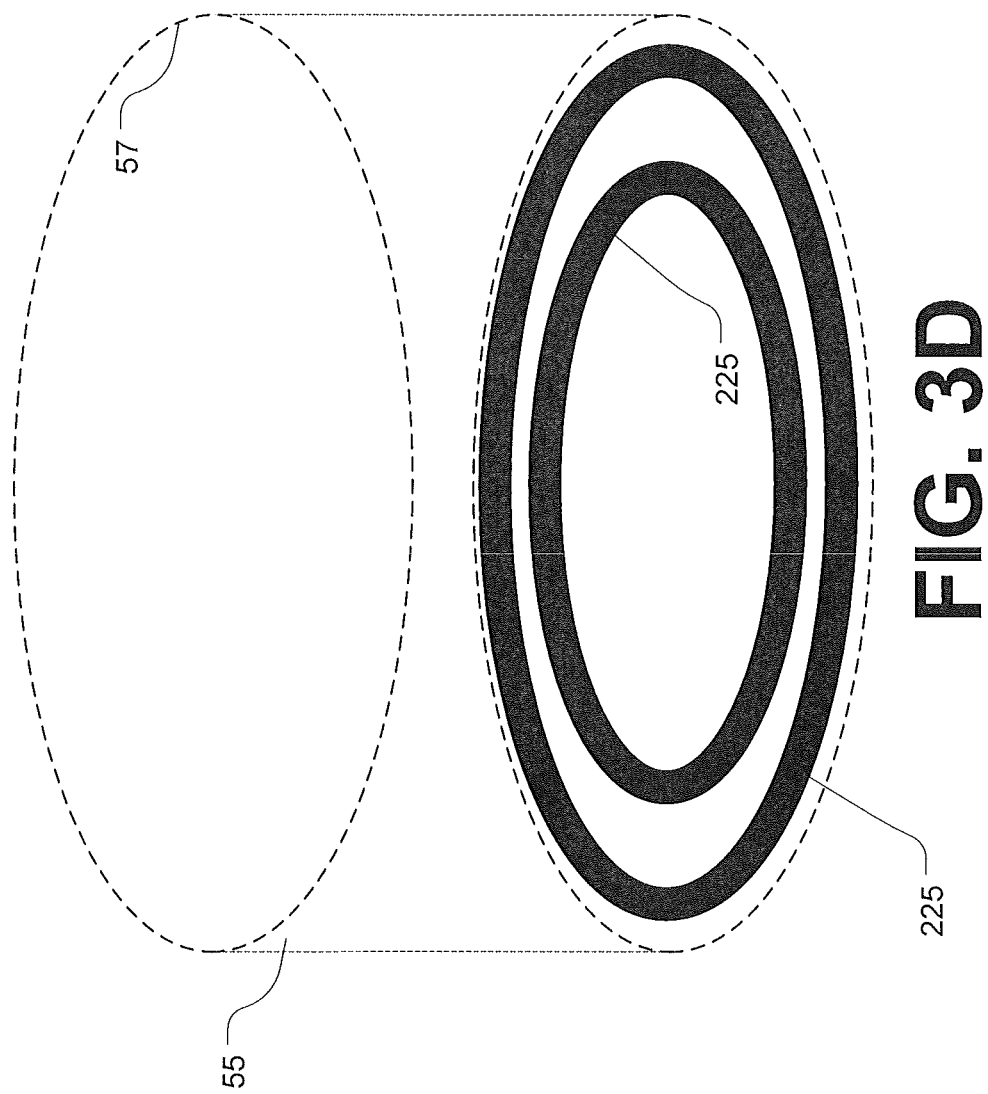
FIG. 3D is a diagram generally depicting an example of a possible configuration of the absorber tower 50 wherein more than one injector 225 is provided near the bottom of the tank section 55.

FIG. 3E and FIG. 3F are diagrams generally depicting a possible configuration of apertures 230. In the example shown in FIG. 3C, the aperture 230 is generally circular or elliptical in shape. In the example shown in FIG. 3D, the orifice 230 is generally square or rectangular in shape.

With reference to FIG. 3G and FIG. 3H, the injector 225 may be configured to include one or more nozzles 320 fitted to the injector 225 via one or more of the apertures 230 (not shown). These nozzles may be provided to better direct (or aim) fluid output to control the flow of aged slurry against the interior wall 57 (FIG. 2) of the tank section 55 (FIG. 2) in a desired direction and in a desired dispersal pattern to optimize coverage of the interior wall 57 or regulate output pressure of the released air/gas.

Figure 4:
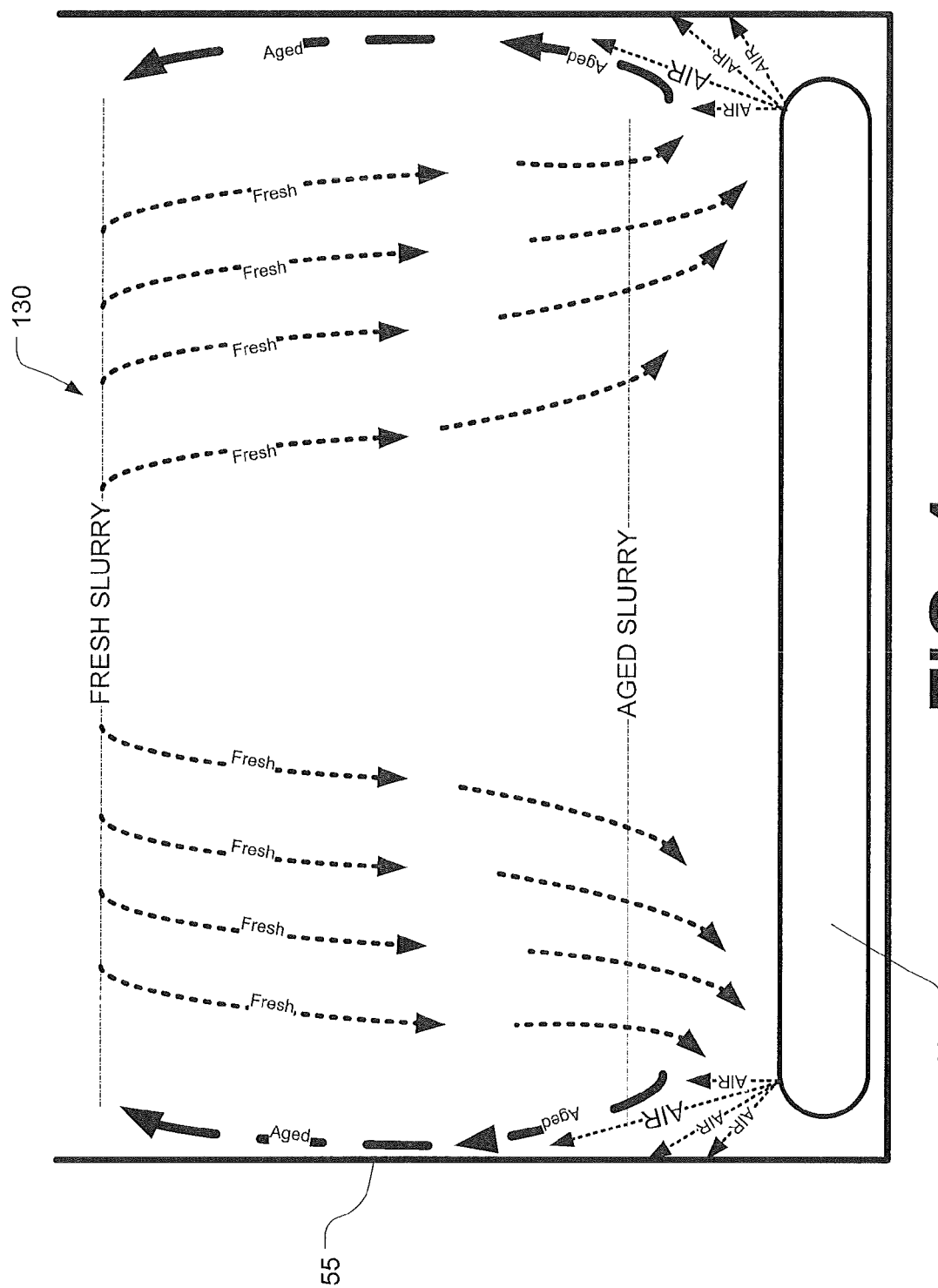
FIG. 4 is a diagram generally depicting the flow of aged slurry as it is forced from near the bottom of the tank section 55 upward toward and against the interior wall 57 of the tank section 55 by air emitted from the apertures 230 of the injector 225.

FIG. 4 is a diagram generally depicting the flow of aged slurry as it is forced from near the bottom of the tank section 55 upward toward and against the interior wall 57 of the tank section 55 by air emitted from the apertures 230 of the injector 225. It can seen that the aged slurry forced upward and against the wall acts as a barrier between the fresh(er) slurry resident toward the upper regions of the tank section 55 and the interior wall 57 of the tank section 55.

Figure 5:
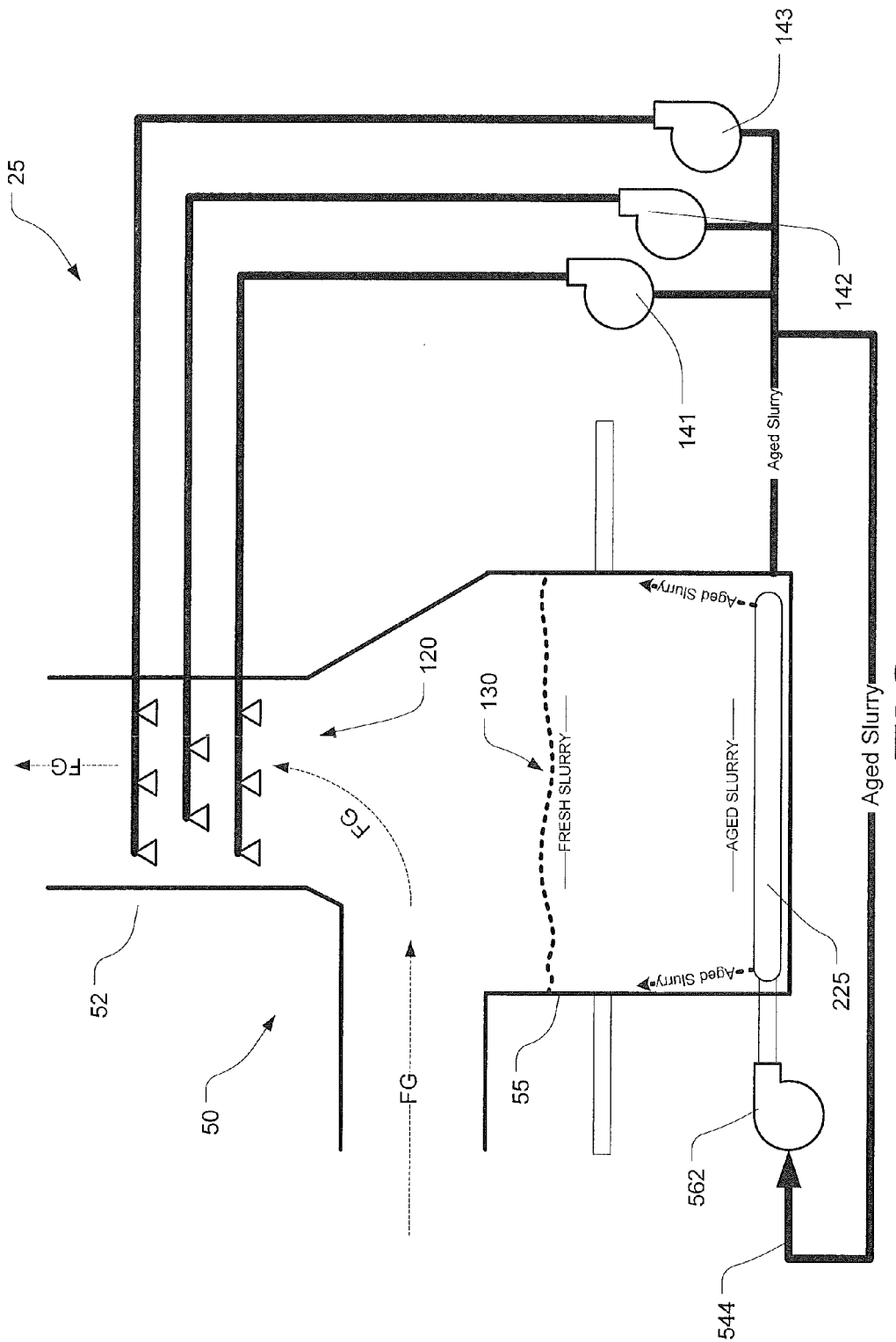
FIG. 5 is a diagram generally depicting a further embodiment of the proposed invention in which aged slurry from the near the bottom of the tank section 55 is provided to the injector 225 and ejected so as to force aged slurry toward and against the interior wall 57.

FIG. 5 is a diagram depicting a further embodiment of the present invention in which the fluid output from the injector 225 is non-saturated slurry (aged slurry) re-circulated from near the bottom of the tank section 55. In this embodiment, aged slurry is pumped via pump 544 from near the bottom of the tank section 55 and injected into the slurry via the injector 225.

It should be noted that, if desired, the injector 225 may be configured to work simultaneously with, or otherwise in conjunction with, a system of gas outlets 112. Both the injector 225 and a system of gas outlets 112 may be provided if desired.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A method of controlling scaling in a flue gas desulphurization system comprising:

directing an alkaline fluid outwardly from an injector in a tank section of an absorber tower against side interior walls for alkaline fluid contact therewith; and forming an aged alkaline slurry barrier on the side interior walls by alkaline fluid movement of aged alkaline slurry upwardly toward and into contact with the side interior walls reducing scaling thereon.

2. The method of claim 1 wherein the injector comprises a hollow conduit in which a plurality of apertures is provided.

3. The method of claim 1 wherein the injector is generally ring-shaped.

4. The method of claim 1 wherein the injector further comprises spray nozzles fitted to said apertures.

5. The method of claim 1 wherein the injector comprises a plurality of apertures fitted with nozzles configured so as to direct alkaline fluid into aged alkaline slurry moving the aged alkaline slurry toward and against the side interior walls of the tank section forming an aged alkaline slurry barrier there against.

6. The method of claim 1 wherein the alkaline fluid comprises a gas.

7. The method of claim 1 wherein the alkaline fluid comprises air.

8. The method of claim 1 wherein the alkaline fluid comprises a non-supersaturated alkaline slurry.

9. The method of claim 1 wherein the aged alkaline slurry comprises an alkaline slurry not supersaturated with calcium sulfite or calcium sulfate.

10. The method of claim 9 wherein the aged alkaline slurry is re-circulated from near the bottom of the tank section.

* * * * *